(12) United States Patent
Hori et al.

(10) Patent No.: US 8,108,094 B2
(45) Date of Patent: Jan. 31, 2012

(54) DIAGNOSIS DEVICE FOR ENERGY TRANSFER IN VEHICLE

(75) Inventors: Toshio Hori, Hitachinaka (JP);
Yoshikuni Kurashima, Mito (JP);
Yoichi Iihoshi, Tsuchiura (JP); Shin Yamauchi, Mito (JP)

(73) Assignee: Hitachi, Ltd., Tokyo (JP)

(*) Notice: Subject to any disclaimer, the term of this patent is extended or adjusted under 35 U.S.C. 154(b) by 1069 days.

(21) Appl. No.: 11/945,604

(22) Filed: Nov. 27, 2007

(65) Prior Publication Data
US 2009/0012673 A1    Jan. 8, 2009

(30) Foreign Application Priority Data
Nov. 29, 2006    (JP) .................... 2006-321892

(51) Int. Cl.
*G01M 17/00*    (2006.01)

(52) U.S. Cl. ............. 701/31; 701/29; 701/30; 701/32; 701/34; 340/438; 340/439

(58) Field of Classification Search ........... 701/29–34; 340/438–439
See application file for complete search history.

(56) References Cited

U.S. PATENT DOCUMENTS
4,542,460 A * 9/1985 Weber .................. 701/1
7,502,718 B2 * 3/2009 Kanamaru ............ 702/184
2007/0056185 A1 * 3/2007 Isono ..................... 34/493

FOREIGN PATENT DOCUMENTS
| JP | 2005-9425 A | | 1/2005 |
| JP | 2005009425 A | * | 1/2005 |
| JP | 2005-198360 A | | 7/2005 |
| JP | 2005198360 A | * | 7/2005 |

OTHER PUBLICATIONS

Japanese Office Action dated Dec. 16, 2008 with English translation (Five (5) pages).

* cited by examiner

*Primary Examiner* — Jack Keith
*Assistant Examiner* — Adam Tissot
(74) *Attorney, Agent, or Firm* — Crowell & Moring LLP

(57) ABSTRACT

Any anomaly in energy transfer is appropriately diagnosed in a vehicle. The energy transfer system of a vehicle is provided with: an input energy computation means (e.g., the chemical energy of fuel computation means) for determining the input energy of the energy transfer system; an output energy computation means (e.g., the vehicle kinetic energy computation means) for determining the energy output of the energy transfer system; and a comparing means (e.g., the comparing means) for comparing the input energy with the output energy. Any anomaly in the energy transfer system (e.g., any anomaly in fuel efficiency) is determined based on the result of comparison by the comparing means.

8 Claims, 10 Drawing Sheets

US 8,108,094 B2

DIAGNOSIS DEVICE FOR ENERGY TRANSFER IN VEHICLE

CLAIM OF PRIORITY

The present application claims priority from Japanese application serial no. 2006-321892, filed on Nov. 29, 2006, the content of which is hereby incorporated by reference into this application.

FIELD OF THE INVENTION

The present invention relates to a diagnosis device for energy transfer in a vehicle, and in particular to an energy transfer diagnosis device configured to diagnose anomalies in energy transfer from a prime mover such as an engine to wheels of the vehicle.

BACKGROUND OF THE INVENTION

The following prior art is described as techniques in relation to energy transfer in a vehicle. In a power generation system including an energy storage for storing electrical energy, a system efficiency determination device operates as follows: it constantly determines energy efficiency related to the energy storage; when electrical energy is being accumulated in the energy storage, it determines the energy efficiency of the entire system from fuel energy, which is obtained by subtracting energy consumed for energy accumulated in the energy storage from fuel energy inputted to the system, and power energy outputted from the system to an operational element; when electrical energy accumulated in the energy storage is being discharged, it determines the energy efficiency of the entire system from fuel energy inputted to the system and the calculated energy efficiency related to the energy storage. A system efficiency improving device controls a control element related to a control-related parameter so that the instantaneous efficiency of the system is maximized. (Refer to JP-A-2005-198360, for example.)

Since the energy transfer system of a vehicle is constructed of machines and mechanisms, it is impossible to completely prevent an energy transfer function from becoming abnormal. When an energy transfer function is abnormal, energy transfer is not carried out as intended, and in general, output energy is reduced and the intended functions of the energy transfer system are not fulfilled.

Therefore, the following operation is effective for the user of a vehicle to maintain the functions of the vehicle: it is detected that the energy transfer function is abnormal, and a warning is sent out and the user is prompted to carry out repair or maintenance work.

However, conventionally known techniques in relation to energy transfer cannot diagnose any anomaly in an energy transfer system.

The invention has been made to solve the above problem, and it is an object of the invention to provide a diagnosis device for energy transfer in a vehicle that detects any anomaly in an energy transfer function and sends out a warning or prompts repair or maintenance work and thus is useful in taking appropriate action.

SUMMARY OF THE INVENTION

To attain the above object, a diagnosis device for energy transfer in a vehicle of the invention includes: an input energy computation means for determining the input energy of the energy transfer system of a vehicle; an output energy computation means for determining the energy output of the energy transfer system; and a comparing means for comparing an input energy determined by the input energy computation means with an output energy determined by the output energy computation means. The diagnosis device determines any anomaly in the energy transfer system according to the result of the comparison by the comparing means.

To attain the object, further, a diagnosis device for energy transfer in a vehicle of the invention includes: an output energy estimation value computation means for determining an estimation value of the output energy of the energy transfer system of a vehicle when it is normal; an output energy computation means for determining the actual energy output of the energy transfer system; and a comparing means for comparing an estimation value of output energy determined by the output energy estimation value computation means with an output energy determined by the output energy computation means. The diagnosis device determines any anomaly in the energy transfer system according to the result of the comparison by the comparing means.

With a diagnosis device for energy transfer in a vehicle of the invention, it is possible to detect that an energy transfer function is abnormal, and to take appropriate action, for example, sending out a warning or prompting repair or maintenance work, based on the result of the detection.

DETAILED DESCRIPTION OF THE PREFERRED EMBODIMENTS

Description will be given to an embodiment of a diagnosis device for energy transfer in a vehicle of the invention with reference to drawings.

Figure 1:
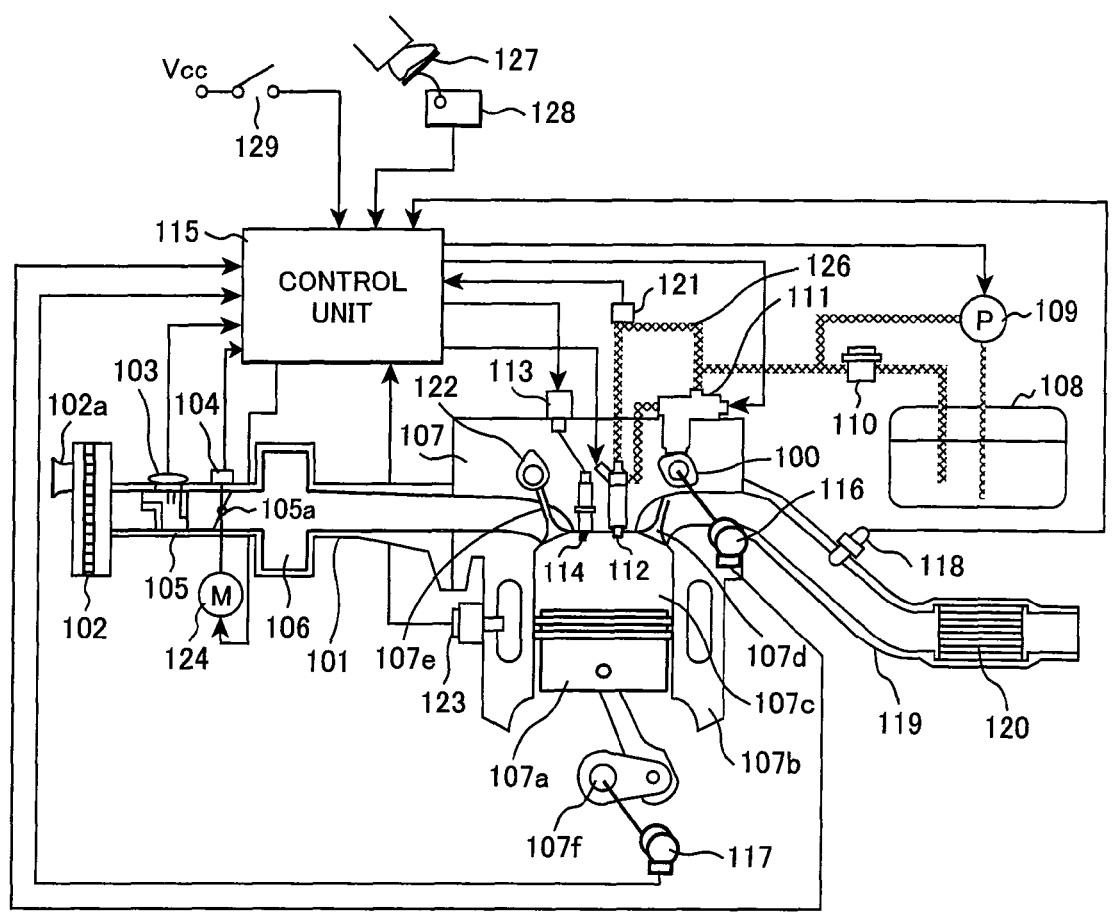
FIG. 1 is a schematic diagram illustrating the gasoline engine system of a vehicle to which an energy transfer diagnosis device of the invention is applied.

First, description will be given to a gasoline engine system as an example of the prime mover of a vehicle to which an energy transfer diagnosis device of the invention is applied with reference to FIG. 1.

The gasoline engine system includes a cylinder injection type internal combustion engine 107 as the prime mover of a vehicle. The engine 107 is so constructed that plural combustion chambers 107c are formed with a cylinder block 107b and pistons 107a.

Intake air flowing into a combustion chamber 107c of the engine 107 is taken in thorough an inlet 102a of an air cleaner 102. It goes through an air flow meter (air flow sensor) 103 which is one of means for measuring an operational state of the engine 107. Then, it goes through a throttle body 105 in which an electrically-controlled throttle valve 105a for controlling an intake air flow rate is housed and enters a collector 106. The electrically-controlled throttle valve 105a is driven by an electric motor 124 and its opening is set by the motor.

The air flow sensor 103 outputs a signal indicating an intake air flow rate to a control unit 115 as an engine control device. The throttle body 105 has a throttle position sensor 104 for sensing the opening of the electrically-controlled throttle valve 105a. The throttle position sensor is also one of the means for measuring the operational state of the engine 107. The throttle position sensor 104 outputs a signal indicating the opening of the electrically-controlled throttle valve 105a to the control unit 115.

Air taken in the collector 106 is distributed and supplied to respective combustion chambers 107c through an intake pipe 101 connected to the cylinder block 107b.

Fuel such as gasoline is transported from a fuel tank 108 to a common rail 126. In the transporting processes, the gasoline is primarily pressurized by a fuel pump 109, regulated to a constant pressure by a fuel pressure regulator 110, and then secondarily pressurized to a higher pressure by a high-pressure fuel pump 111. The high-pressure fuel is directly injected into the combustion chambers 107c by injectors 112 installed in the common rail 126 for the respective combustion chambers 107c.

The common rail 126 is provided with a fuel pressure sensor 121. The fuel pressure sensor 121 senses (measures) the fuel pressure in the common rail 126 and outputs a signal indicating the fuel pressure to the control unit 115.

The cylinder block 107b is provided with spark plugs 114 for the respective combustion chambers 107c. Fuel injected into a combustion chamber 107c is ignited by a spark plug 114 according to an ignition signal with high-voltage induced by an ignition coil 113.

The cam shaft 100 of an exhaust valve 107d A is provided with a cam angle sensor 116. The cam angle sensor 116 outputs a signal for sensing a phase of the cam shaft 100 to the control unit 115. The cam angle sensor 116 may be installed on the cam shaft 122 on the intake valve 107e side.

The cylinder block 107b is provided with a coolant temperature sensor 123 for sensing the temperature of cooling water for the engine 107. The coolant temperature sensor 123 outputs a signal indicating the temperature of cooling water for the engine 107 to the control unit 115.

A crankshaft 107f of the engine 107 is provided with a crank angle sensor 117 to sense the number of revolutions and the phase of the crankshaft 107f. The crank angle sensor 117 outputs a signal indicating the number of revolutions and the phase of the crankshaft 107f to the control unit 115.

An exhaust pipe 119 is provided with a three-way catalyst 120. An air-fuel ratio sensor 118 is installed upstream from the three-way catalyst 120. The air-fuel ratio sensor 118 senses oxygen in exhaust gas and outputs a resultant sensed signal to the control unit 115.

Figure 2:
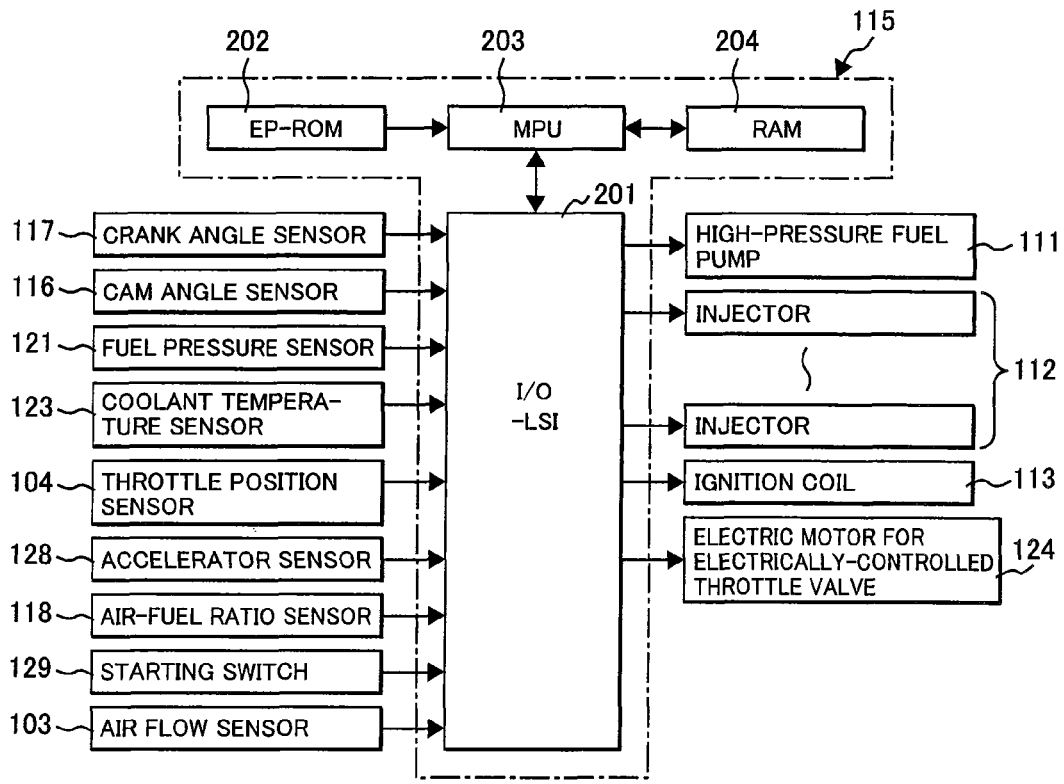
FIG. 2 is a schematic diagram of a control unit used in a gasoline engine system.

As illustrated in FIG. 2, the control unit 115 is constructed based on a microcomputer comprised of a MPU 203, an EP-ROM 202, a RAM 204, an I/O-LSI 201, and the like. The control unit takes in signals from various sensors and switches as input. Such sensors and switches include the above-mentioned air flow sensor 103, throttle position sensor 104, cam angle sensor 116, crank angle sensor 117, air-fuel ratio sensor 118, fuel pressure sensor 121, and coolant temperature sensor 123, and furthermore include an accelerator sensor 128 for sensing an amount of depression of an accelerator pedal 127, a starting switch 129, and the like. The control unit carries out predetermined computation based on the quantities of engine state (e.g., crank rotation angle, throttle opening, number of engine revolutions, fuel pressure, etc.) acquired from the sensors and switches. The control unit outputs various control signals obtained as the result of this computation to the high-pressure fuel pump 111, injectors 112, ignition coil 113, and the electric motor 124 of the electrically-controlled throttle valve 105a. The control unit thereby carries out amount of fuel supply control (air-fuel ratio control) and ignition control.

Figure 3:
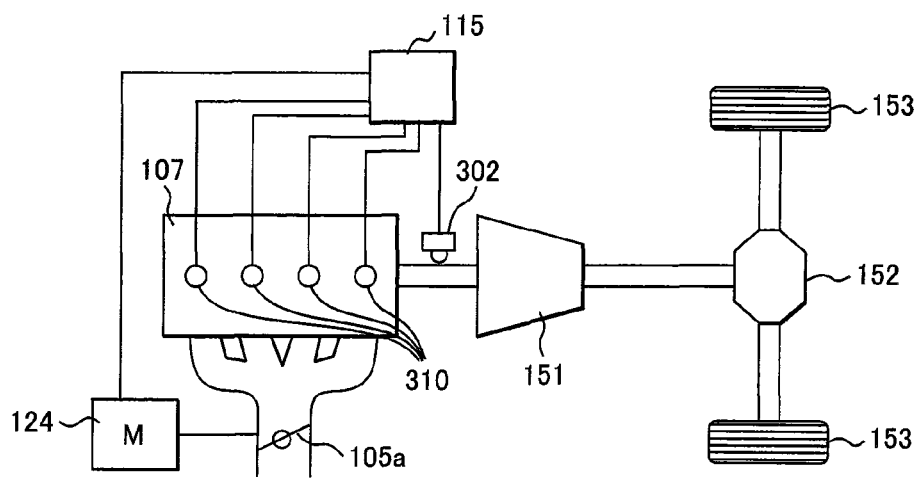
FIG. 3 is a schematic diagram illustrating the configuration of the power transmission path of a vehicle in an embodiment to which an energy transfer diagnosis device of the invention is applied.

FIG. 3 illustrates a configuration of the power transmission path of a vehicle to which an energy transfer diagnosis device of the invention is applied. An output shaft (crankshaft 107f) of the engine 107 is connected to an input of a transmission 151 under the power transmission relation. The transmission 151 can be constructed of an automatic transmission including a torque converter. The output of the transmission 151 is connected to left and right wheels 153 through a differential device 152 under the power transmission relation.

Chemical energy of fuel is converted into combustion pressure kinetic energy by the engine 107, and is outputted as brake power energy to the output shaft of the engine 107. The brake power energy is transferred as wheel output kinetic energy to the wheels 153 through the transmission 151 and the differential device 152, and is transferred as wheel kinetic energy to outside the vehicle (road surface) by the wheels 153.

Figure 4:
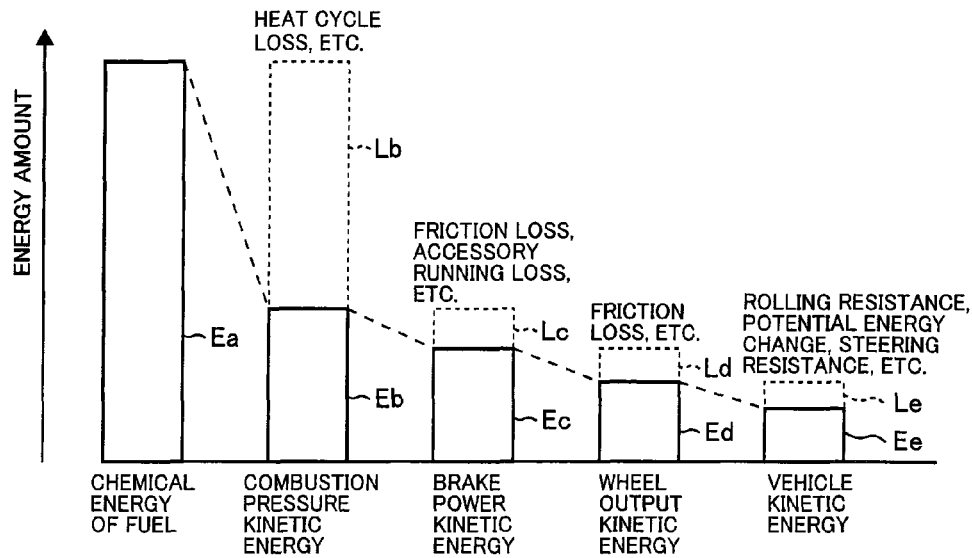
FIG. 4 is an explanatory drawing illustrating the energy transfer path of a vehicle mounted with a gasoline engine system and its phases.

In the vehicle mounted with the gasoline engine system, FIG. 4 illustrates an energy transfer path with energy transition until chemical energy in the possession of fuel is ultimately converted to the kinetic energy of the vehicle.

As illustrated in FIG. 4, the chemical energy $E_a$ in the possession of fuel is converted into combustion pressure kinetic energy $E_b$ through combustion in the combustion chambers 107c of the engine 107. The pressure in the combustion chambers 107c is raised by combustion, and this raised pressure overcomes load and pushes down the pistons 107a. This kinetic work is represented as combustion pressure kinetic energy Eb. During this combustion, part of the chemical energy Ea of fuel is converted into combustion pressure kinetic energy Eb, and the other part becomes a loss Lb such as heat cycle loss including exhaust heat, because of a theoretical efficiency of conversion into kinetic energy due to a heat cycle and degradation in efficiency due to deviation from an ideal heat cycle, and the like.

The efficiency of conversion from chemical energy Ea to combustion pressure kinetic energy Eb takes a predetermined value because of various factors on which the combustion state depends. When various factors on which the combustion state depends are brought into a state different from design intent, it takes a value different from design intent. If a compression ratio becomes lower than a design value, for example, the conversion efficiency is degraded.

The combustion pressure kinetic energy Eb is converted into brake power kinetic energy Ec outputted from the engine 107. At this time, friction loss due to friction at the shaft portion of the engine 107, accessory running loss lost as energy consumed to drive a valve operating system and energy for driving a generator for driving a generator and other accessories driven with the engine 107, and the like are produced. Therefore, the combustion pressure kinetic energy Eb is transferred as brake power kinetic energy Ec to the engine output shaft with a predetermined efficiency.

Therefore, for example, when a friction loss is increased due to lubrication failure in the shaft portion of the engine 107 or the like, the efficiency of conversion from combustion pressure kinetic energy Eb to brake power kinetic energy Ec is degraded as compared with other cases. This is the same with cases where the work efficiency of an accessory is degraded.

The brake power kinetic energy Ec is transferred to the wheels 153 through a drive train including the transmission 151, and is converted into wheel output kinetic energy Ed. At this time as well, friction loss due to friction at the shaft portion of the transmission 151, the transfer loss of fluid coupling, the friction loss of a brake mechanism, and the like are produced. Therefore, the brake power kinetic energy Ec is transferred as wheel output kinetic energy Ed to the wheels 153 with a predetermined efficiency.

Therefore, for example, when a friction loss is increased due to lubrication failure in the drive train or the like, the efficiency of conversion from brake power kinetic energy Ec to wheel output kinetic energy Ed is degraded as compared with other cases.

The wheel output energy Ed is converted into vehicle kinetic energy Ee. The vehicle kinetic energy Ee causes the vehicle to make motion on a road surface through tires (wheels 153), overcomes vehicle running resistance and accelerates the vehicle, and maintains vehicle speed. At this time, loss is produced due to the rolling resistance of the tires, change in the potential energy of the vehicle, steering resistance, and the like, and the energy is transferred with a predetermined efficiency. Therefore, when the rolling resistance is increased due to reduction in the air pressure of a tire, the efficiency of conversion from wheel output kinetic energy Ed to vehicle kinetic energy Ee is degraded as compared with other cases.

The above description of energy transfer is an example in which the boundaries in the energy transfer system are delimited as described above. The boundaries suitable for attaining the above object can be appropriately selected. In general, energy is reduced with a predetermined efficiency as it is transferred.

Therefore, regarding a rate of work done by a vehicle when a predetermined quantity of fuel is consumed, namely the energy conversion efficiency, it takes a higher value namely more favorable value with increase in the above-mentioned efficiencies in an energy transfer path with energy transition of FIG. 4. The energy conversion efficiency is the ratio of a work done by a vehicle for some purpose to fuel consumption. Therefore, it is a concept close to efficiency with respect to a quantity of fuel consumed to achieve the purpose of use of a vehicle, namely fuel efficiency. In general, a vehicle is so designed that the most favorable fuel efficiency within the range permitted by design limitation will be achieved. For this purpose, various efforts for friction reduction and the like have been made.

However, various mechanisms, controls, and specifications for favorable fuel efficiency may become dysfunctional or insufficient by such an event as failure, deterioration, and the like. In this case, degradation in fuel efficiency will be incurred. This brings a disadvantage of increased fuel consumption to drivers and results in increased emission of carbon dioxide, which is contributory to global warming.

Therefore, when such an event occurs, it is desirable to quickly detect it and take measures, such as warning the driver, leading the operating state to such a state as to avoid this situation, and the like.

One of indexes for fuel efficiency is how much distance a vehicle runs per a predetermined quantity of fuel. However, the value of this index largely differs depending on how to drive.

For example, when large acceleration/deceleration is repeated and a brake is frequently applied, loss due to heat energy is increased and this impairs fuel efficiency. This is a phenomenon caused by the driver's operation though mechanisms of the vehicle operate in accordance with design intent. Therefore, such an event should not be detected for the above-mentioned object. Consequently, it is appropriate to use the energy conversion efficiency of the energy transfer path of a vehicle as an index for evaluating the fuel efficiency.

An energy transfer diagnosis device is configured to detect change in the energy transfer efficiency (namely energy conversion efficiency), that is, to detect change in fuel efficiency for which the invention is intended, in an energy transfer path, and to determine any anomaly in the energy transfer system. Description will be given to one embodiment of this energy transfer diagnosis device with reference to FIG. 5.

The energy transfer diagnosis device includes a supplied fuel energy computation means 501, a combustion pressure kinetic energy computation means 502, a brake power kinetic energy computation means 503, a vehicle kinetic energy computation means 504, and comparing means 505 to 508. It is realized by software processing by the control unit 115 for carrying out engine control or an in-vehicle computer at a higher level.

The supplied fuel energy computation means 501, combustion pressure kinetic energy computation means 502, brake power kinetic energy computation means 503, and vehicle kinetic energy computation means 504 are respectively an input energy computation means or an output energy computation means for determining the corresponding energies in the above-mentioned energy transfer path. The comparing means 505 to 508 respectively make comparison based on the results of computation by the energy computation means 501 to 504 to determine anomalies. This drawing is for explaining the concept of the invention, and the input and output of each block can be appropriately selected when the invention is applied.

The supplied fuel energy computation means 501 determines the chemical energy Ea of supplied fuel from the injection quantity of the injectors 112 and the property of the fuel.

The combustion pressure kinetic energy computation means 502 determines combustion pressure kinetic energy Eb from the combustion pressure of the combustion chambers 107c and the phase of the crankshaft 107f.

The brake power kinetic energy computation means 503 determines brake power kinetic energy Ec from the brake torque and the number of shaft rotations of the engine output shaft.

The vehicle kinetic energy computation means 504 determines vehicle kinetic energy Ee from vehicle speed and the altitude of the vehicle.

The comparing means 505 compares the chemical energy Ea of fuel determined by the supplied fuel energy computation means 501 with the vehicle kinetic energy Ee determined by the vehicle kinetic energy computation means 504. It thereby determines whether or not the vehicle has done a work in line with the fuel consumed. That is, the comparing means 505 compares the uppermost-stream (origin) input of energy with the lowermost-stream (final) input of energy in the energy transfer system of the vehicle, and thereby evaluates the fuel efficiency of the entire vehicle. Thus, the comparing means 505 determines any anomaly in fuel efficiency.

The comparing means 506 compares the chemical energy Ea of fuel determined by the supplied fuel energy computation means 501 with the combustion pressure kinetic energy Eb determined by the combustion pressure kinetic energy computation means 502. It thereby determines any anomaly in combustion in the engine 107. That is, the comparing means 506 compares the chemical energy Ea in the possession of fuel with the combustion pressure kinetic energy Eb, and thereby evaluates the efficiency of conversion from chemical energy Ea to combustion pressure kinetic energy Eb. If a phenomenon that the compression ratio of the engine 107 becomes lower than its design value occurs from some cause, for example, the efficiency of conversion from chemical energy Ea to combustion pressure kinetic energy Eb is degraded. Therefore, the comparing means 506 can detect it and determines any anomaly in combustion in the engine 107.

The comparing means 507 compares the combustion pressure kinetic energy Eb determined by the combustion pressure kinetic energy computation means 502 with the brake power kinetic energy Ec determined by the brake power kinetic energy computation means 503. It thereby determines any anomaly in the power train. That is, the comparing means 507 evaluates the efficiency of conversion from combustion pressure kinetic energy Eb to brake power kinetic energy Ec. If a phenomenon that friction loss is increased occurs due to lubrication failure in the engine 107 or the like, for example, the efficiency of conversion from combustion pressure kinetic energy Eb to brake power kinetic energy Ec is degraded. Therefore, the comparing means 507 can detect it and determines any anomaly in the power train.

The comparing means 508 compares the brake power kinetic energy Ec determined by the brake power kinetic energy computation means 503 with the vehicle kinetic energy Ee determined by the vehicle kinetic energy computation means 504. It thereby determines any anomaly in the drive train. That is, the comparing means 508 evaluates the efficiency of conversion from brake power kinetic energy Ec to vehicle kinetic energy Ee. For example, if a phenomenon that friction loss is increased occurs due to lubrication failure in the drive train or the like or if a phenomenon that the rolling resistance is increased occurs due to reduction in the air pressure of a tire, thereby the efficiency of conversion from brake power kinetic energy Ec to vehicle kinetic energy Ee is degraded. Therefore, the comparing means 508 can detect it and determines any anomaly in the drive train.

As mentioned above, the comparing means 508 evaluates the efficiency of conversion from brake power kinetic energy Ec to vehicle kinetic energy Ee described with reference to FIG. 4. It does not compute wheel output kinetic energy Ed positioned in-between. This is because the description is given based on an embodiment in which a means for determining wheel output kinetic energy Ed is not provided. When an appropriate detecting means can beset, evaluation and detection can be carried out as mentioned above, needless to add.

Based on the determination of an anomaly by each part mentioned above, it is possible to take appropriate action, including sending out a warning and prompting repair or maintenance work.

In this embodiment, the computation means function as follows. For the determination of an anomaly in fuel efficiency, the supplied fuel energy computation means 501 functions as an input energy computation means, and the vehicle kinetic energy computation means 504 functions as an output energy computation means. For the determination of an anomaly in combustion, the supplied fuel energy computation means 501 functions as an input energy computation means, and the combustion pressure kinetic energy computation means 502 functions as an output energy computation means. For the determination of an anomaly in the power train, the combustion pressure kinetic energy computation means 502 functions as an input energy computation means, and the brake power kinetic energy computation means 503 functions as an output energy computation means. For the determination of any anomaly in the drive train, the brake power kinetic energy computation means 503 functions as an input energy computation means, and the vehicle kinetic energy computation means 504 functions as an output energy computation means.

Description will be given to a detailed example of each computation means.

Figure 6:
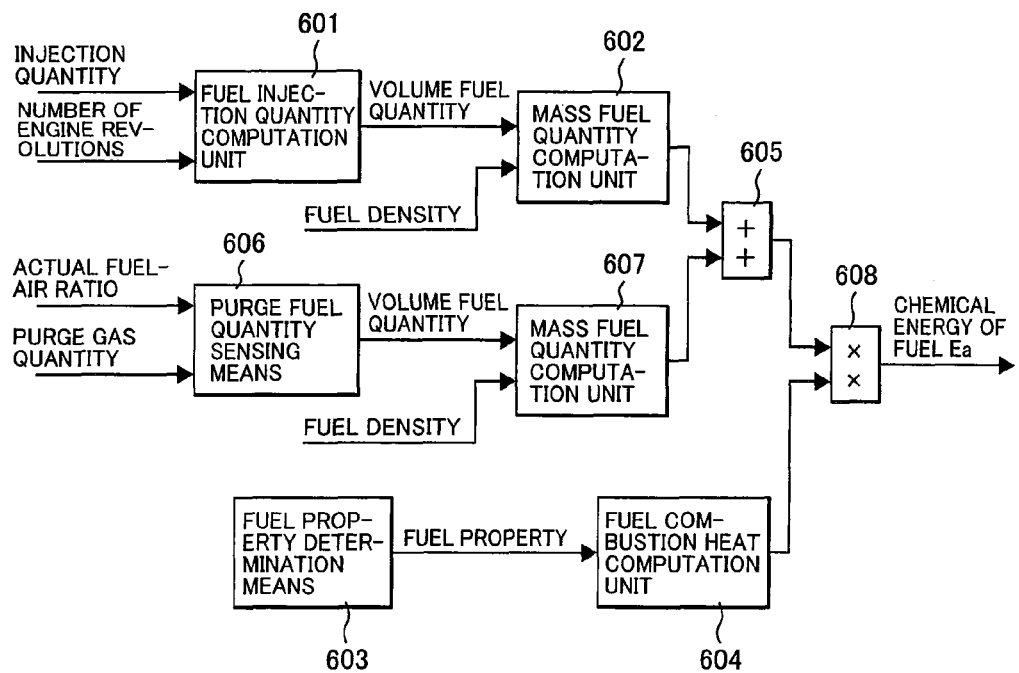
FIG. 6 is a block diagram illustrating a detailed example of a supplied fuel energy computation means in that embodiment.

FIG. 6 illustrates a detailed example of the supplied fuel energy computation means 501 for determining the chemical energy Ea of supplied fuel.

The supplied fuel energy computation means 501 includes an fuel injection quantity computation unit 601, a mass fuel quantity computation unit 602, a fuel property sensing means 603, a fuel combustion heating value computation unit 604, a sum computation unit 605, a purge fuel quantity sensing means 606, a mass fuel quantity computation unit 607, and a fuel chemical energy computation unit 608.

In the gasoline engine system, as mentioned above, a quantity of fuel corresponding to the engine operating state is supplied to the combustion chambers 107c by controlling a valve opening time of the injectors 112. Therefore, an injection quantity required for one time of injection is determined in the process of determining the valve opening time of the injectors 112. The fuel injection quantity computation unit 601 is inputted with it (the injection quantity required for one time of injection). Further, the number of times of fuel injection per unit time is in proportion to the number of engine revolutions. Therefore, the fuel injection quantity computation unit 601 is inputted with a number of engine revolutions together. It determines a volume fuel quantity to be supplied by multiplying the number of times of fuel injection per unit time by the injection quantity.

In fuel injection from an injector 112, the volume flow rate is controlled by a fuel flow metering orifice; therefore, what is obtained through computation by the fuel injection quantity computation unit 601 is the volume fuel quantity. To determine a mass fuel injection quantity to be supplied, therefore, the volume fuel quantity determined by the fuel injection quantity computation unit 601 is multiplied by a fuel density. This computation is carried out at the mass fuel quantity computation unit 602. The density of fuel may be the typical density of fuel used. Additionally it is desirable to sense fuel temperature and determine the mass fuel quantity in consideration of the fuel temperature to the enhancement of computation accuracy for the mass fuel quantity.

As fuel contributory to combustion in the combustion chambers 107c of the engine 107, a side from injection fuel, there is evaporated fuel contained in gas for purging a canister (not shown) connected to the fuel tank 108. A purge fuel quantity determination means 606 determines the volume quantity of purge fuel supplied to the combustion chambers 107c based on the actual air-fuel ratio of purge gas and a purge gas quantity per unit time. In engine control, the quantity of canister purge gas is commonly grasped and controlled since it has influence on the air-fuel ratio control on the engine. In this embodiment, the actual air-fuel ratio of purge gas and a purge gas quantity per unit time are referred to as parameters of control result.

Similarly with the mass fuel quantity computation unit 602, a mass fuel quantity computation unit 607 determines a mass fuel quantity of fuel in purge gas by multiplying the volume quantity of fuel in purge gas determined by the purge fuel quantity determination means 606 by a fuel density.

The sum computation unit 605 determines a sum quantity of fuel supplied to the engine 107 by adding the mass quantity per unit time of fuel supplied from the injectors 112, which determined by the mass fuel quantity computation unit 602, to the mass quantity of fuel in purge gas determined by the mass fuel quantity computation unit 607.

The fuel property determination means 603 determines the properties of fuel. There are several means for determining the properties of fuel depending on the system to which the invention is applied. For example, fuel property determining means by using a fuel property sensor, by using a response to air-fuel ratio during transient operation, by using a rotation behavior at startup of the engine, or by using the degree of combustion stability in cold engine, and the like.

The fuel combustion heating value computation unit 604 determines the combustion heating value of fuel per unit mass from the properties of fuel obtained by the fuel property determination means 603. Specifically, the fuel combustion heating value computation unit 604 has a storage storing a table with average values of respective combustion heating values of fuel per unit mass obtained beforehand according to various fuel properties of fuel, and determined the combustion heating value by referring the table.

The fuel chemical energy computation unit 608 multiplies the total fuel quantity (mass fuel quantity) determined with the sum computation unit 605 by the combustion heating value of fuel per unit mass determined with the fuel combustion heating value computation unit 604. Thereby, the chemical energy Ea per unit time of fuel supplied to the engine 107 is determined.

Figure 7:
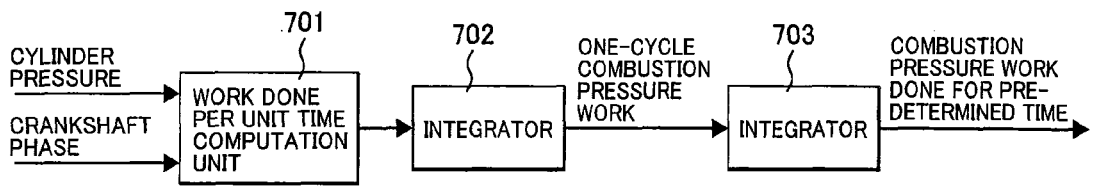
FIG. 7 is a block diagram illustrating an example of a combustion pressure work done computation means in that embodiment.

FIG. 7 illustrates an example of a combustion pressure work done-computation means for determining a combustion pressure work done per predetermined time in the system having the cylinder pressure sensor 310 illustrated in FIG. 3.

A work done per unit time-computation unit 701 takes in a cylinder pressure, which is outputted from the cylinder pressure sensor 310 provided in a predetermined cylinder, and the phase of the crankshaft. Then, the computation unit 701 determines a work done by the cylinder pressure per unit time based on the cylinder pressure and the phase of the crankshaft. The travel distance of a piston 107a at any given time differs depending on the phase of the crankshaft. Therefore, when determining the cylinder pressure×the travel distance of the piston, which is equivalent to a work done by cylinder pressure, the phase of the crankshaft is taken in the computation unit 701.

In four-cycle engines, one cycle is composed of four strokes which are intake, compression, expansion, and exhaust. Therefore, a work done by one time of combustion is equivalent to what is obtained by integrating a work done per unit time by an amount equivalent to one cycle. Therefore, an integrator 702 integrates a work done per unit time by an amount equivalent to one cycle to determine a work done in one cycle. An integrator 703 in the subsequent stage integrates the work done in one time of combustion, computed by the integrator 702, by an amount equivalent to a predetermined time to determine a combustion work done per predetermined time.

In the above description is explained that a work done at one cylinder is determined. However, for an engine having plural cylinders, the combustion pressure kinetic energy Eb per unit time of the entire engine can be determined by constructing the combustion pressure kinetic energy computation means 502 so as to carry out the following processing: it individually carries out the above processing for the work done on a cylinder-by-cylinder basis and sums the obtained values to determine the combustion pressure kinetic energy Eb.

Even when the cylinder pressure sensor 310 is not provided, this embodiment can be applied by determining a cylinder pressure by any of the following methods: a method of indirectly determining a cylinder pressure from the rotational speed of the crankshaft during combustion; a method of indirectly determining a cylinder pressure from a cylinder block vibration signal from a knock sensor; and the like.

Figure 8:
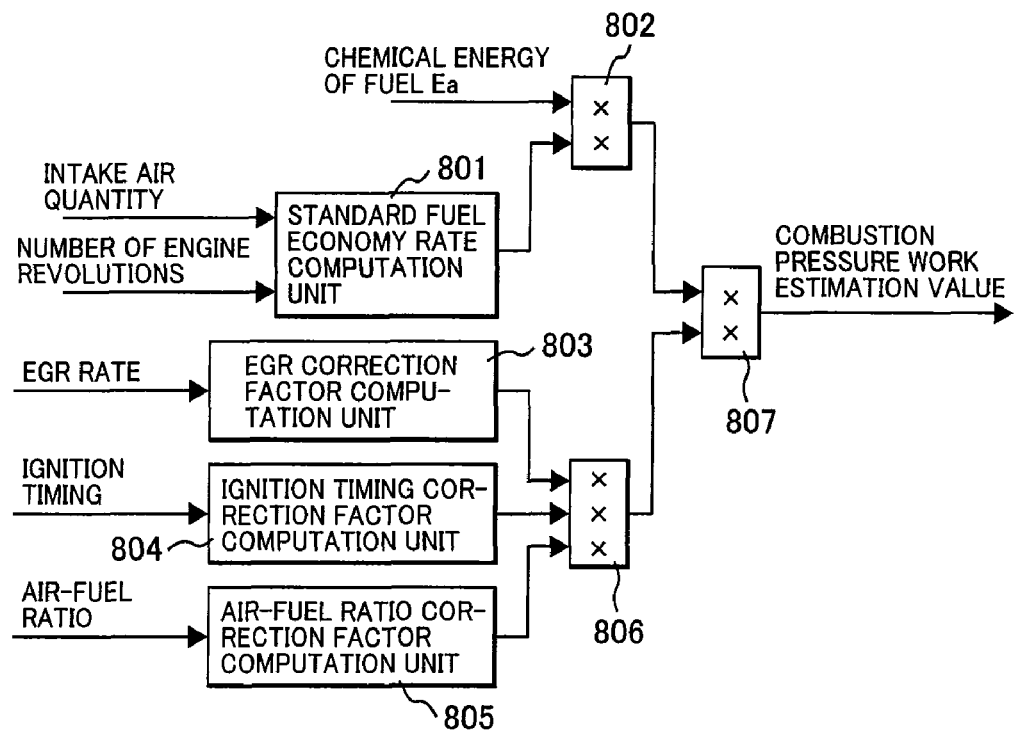
FIG. 8 is a block diagram illustrating an example of a combustion pressure work done estimation computation means in that embodiment, explaining the configuration of the embodiment of the invention.

FIG. 8 illustrates an example of a combustion pressure work done estimation computation means for estimating a combustion pressure work done from fuel energy consumed and the operating state of the engine.

A standard fuel efficiency rate computation unit 801 determines a rate of the fuel efficiency in a standard state from an intake air flow rate and a number of engine revolutions which are basic parameters of the operating state of an engine.

A combustion pressure work estimation value computation unit 802 multiplies the rate of the fuel efficiency in the standard state determined with the standard fuel efficiency rate computation unit 801 by the chemical energy Ea of fuel, and thereby determines a value for estimating an amount by which fuel energy is converted into combustion pressure work done as the next form of energy transfer.

There are actually various states of an engine 107 different from a standard state. In a state different from the standard state, the energy conversion efficiency varies even though the engine state is in normal. Subsequently, this variation is corrected.

An EGR correction factor computation unit 803 computes the following correction factor according to an EGR (Exhaust Gas Recirculation) rate. The correction factor is for improving the energy conversion efficiency by reducing the pumping loss of the engine 107 by using EGR.

An ignition timing correction factor computation unit 804 determines the following correction factor according to ignition timing. The correction factor is for correcting change in energy conversion efficiency due to the deviation of ignition timing from the standard state. More specifically, it is equivalent to ignition timing retard for meeting a request to reduce the output of the engine 107, change in ignition timing due to knock control, and the like.

An air-fuel ratio correction factor computation unit 805 determines the following correction factor according to an air-fuel ratio. The correction factor is for correcting change in energy conversion efficiency due to the deviation of the air-fuel ratio of the engine 107 from the standard state. More specifically, it is equivalent to making an air-fuel ratio rich for the enhancement of engine cooling, making an air-fuel ratio lean for the enhancement of fuel efficiency, and the like.

Thus, the correction factors obtained at the correction factor computation units 803 to 805 are multiplied together by a multiplier 806 to determine a total correction factor. A combustion pressure work estimation value in the standard state, obtained at the combustion pressure work estimation value computation unit 802, is multiplied by the total correction factor, obtained at the multiplier 807, at a multiplier 806. Thus, a corrected combustion pressure work estimation value in the actual state of the engine 107 is obtained.

Needless to add, various corrections for obtaining energy conversion efficiency in the actual state of the engine 107 can be appropriately selected when these computations are applied.

The obtained combustion pressure work estimation value is a value obtained when the engine 107 is in normal state. Therefore, change in energy conversion efficiency can be detected by comparing this combustion pressure work estimation value with the combustion pressure work done obtained by the computation means described with reference to FIG. 7.

There is another method for numeric computation for comparison. The same effect can also be obtained by using a method of comparing a ratio between a determination value of combustion pressure work and a burnout fuel with the energy conversion efficiency under normal conditions. Incidentally the energy conversion efficiency under normal conditions is obtained by multiplying the standard fuel efficiency rate obtained with the standard fuel efficiency rate computation unit 801 by the total correction factor obtained with the multiplier 806.

Figure 9:
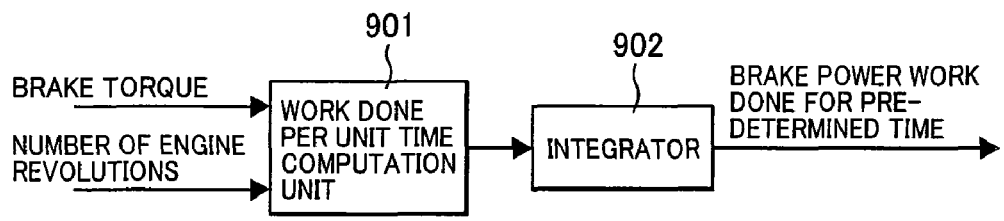
FIG. 9 is a block diagram illustrating a detailed example of a brake power kinetic energy computation means in that embodiment, explaining the configuration of the embodiment of the invention.

FIG. 9 illustrates a detailed example of the brake power kinetic energy computation means 503 for determining brake power kinetic energy Ec.

A work done per unit time computation unit 901 determines a work done per unit time by brake torque×a number of shaft rotations as a work externally done by the output shaft of the engine 107. This brake torque is the brake torque of the engine output shaft measured by the torque sensor 302 illustrated in FIG. 3.

An integrator 902 integrates the output of the work done per unit time computation unit 901 to obtain a brake power work done per predetermined time. The brake power work done per predetermined time is handled as brake power kinetic energy Ec.

Description will be given to the relation between combustion pressure kinetic energy Eb and brake power kinetic energy Ec. The engine 107 requires energy to operate itself, and obtains this energy from the combustion pressure kinetic energy Eb. Specifically, the energy Eb is required for the motion of the intake/exhaust valve, the up-and-down motion of the pistons, and the like. Aside from such a direct engine operation, the energy Eb is also required for the works of oil lubrication, cooling water circulation, and the like. Furthermore the energy Eb is provided as energy for operating a generator for generating electrical energy which is required for an engine control system and others. Therefore, brake power kinetic energy Ec is equivalent to what is obtained by subtracting these loss energies from combustion pressure kinetic energy Eb.

Figure 10:
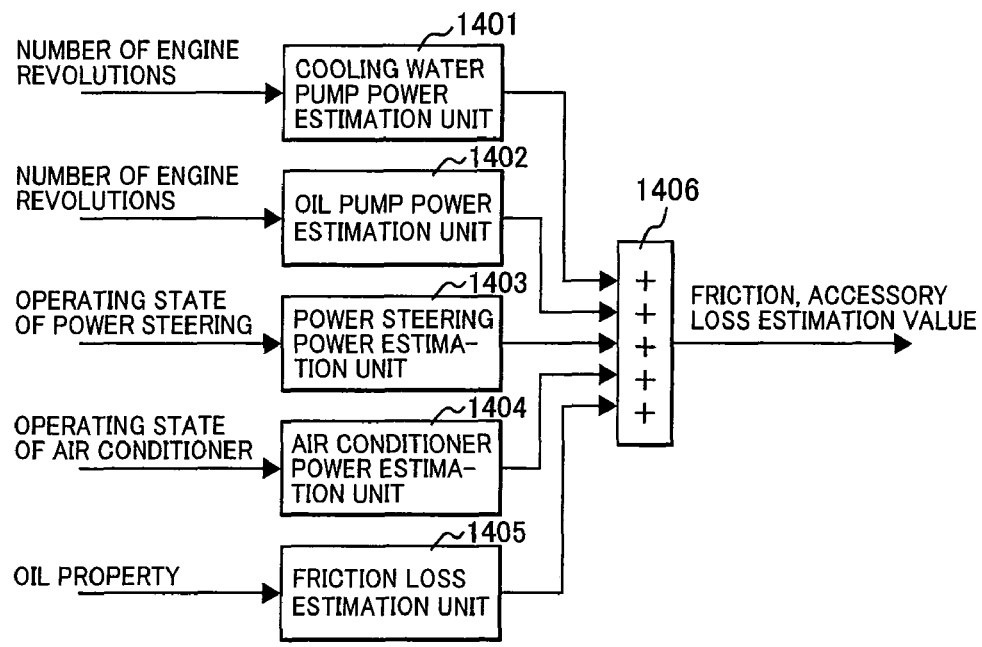
FIG. 10 is a block diagram illustrating an example of a loss energy estimation computation means in that embodiment.

FIG. 10 illustrates an example of a loss energy estimation computation means for estimating loss energy produced when the combustion pressure kinetic energy Eb is converted to the brake power kinetic energy Ec, mentioned above.

A cooling water pump power estimation unit 1401 estimates the power energy of a cooling water pump driven by engine power from a number of engine revolutions.

An oil pump power estimation unit 1402 estimates the power energy of an oil pump similarly driven by engine power.

A power steering-power estimation unit 1403 estimates power energy consumed in a power steering system from the operating state of a power steering driven by engine power.

An air conditioner power estimation unit 1404 estimates power energy consumed in an air conditioning system similarly driven by engine power from the operating state of an air conditioner as an air conditioning device for the vehicle compartment.

A friction loss estimation unit 1405 estimates frictional energy consumed for the engine to operate itself, described above, from the properties of engine oil.

A sum computation unit 1406 sums the energies determined as mentioned above to determine a friction and accessory loss estimation value.

Accuracy of the loss energy estimation at the engine may be enhanced by estimating power energy consumed at the generator during the generating state of the generator and adding this power energy to the loss energy though this is not shown in the drawing.

Thus obtained friction and accessory loss estimation value, that is, friction and accessory loss energy is a value obtained under normal conditions. Therefore, any anomaly in friction or accessory loss can be detected by subtracting the friction and accessory loss energy from the combustion pressure kinetic energy Eb obtained by the combustion pressure kinetic energy computation means 502, and comparing such a subtracted value with the brake power energy Ec obtained by the brake power kinetic energy computation means 503.

Figure 11:
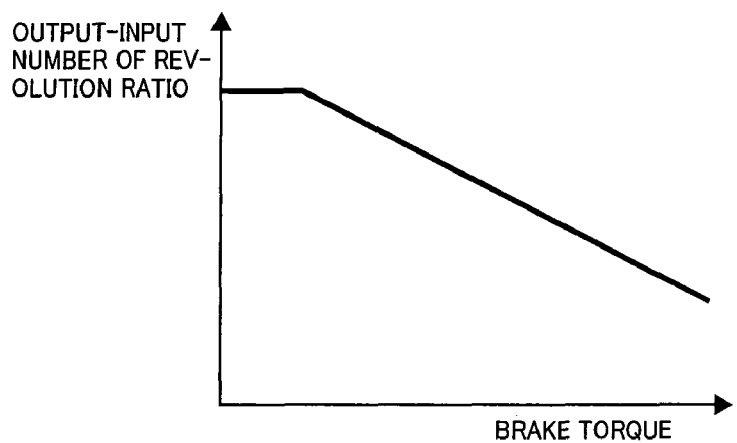
FIG. 11 is a graph illustrating an example of the characteristics of a torque converter used in an automatic transmission.

Description will be given to an example of the characteristics of a torque converter frequently used in automatic transmission with reference to FIG. 11. In FIG. 11, the horizontal axis represents the output brake torque of the torque converter, and the vertical axis represents the ratio of number of rotations between an input shaft and an output shaft of the torque converter.

When the load exerted on the drive train is low and the output brake torque is small, the ratio of number of rotations between the input and output shafts is close to 1 and the difference in torque between the input shaft and the output shaft is also small. As the load exerted on the drive shaft is increased, the output brake torque requires a higher value and at the same time the numbers of rotations of the input and output shafts are reduced. That is, the output number of rotations is reduced.

This characteristic is expressed by a numeric expression as follows: input brake torque×number of input shaft rotations× efficiency=output brake torque×number of output shaft rotations. That is, the left-hand side represents the input energy of the torque converter and the right-hand side represents the output energy of the torque converter. Hence, the efficiency in the expression represents the energy transfer efficiency of the torque converter.

Figure 12:
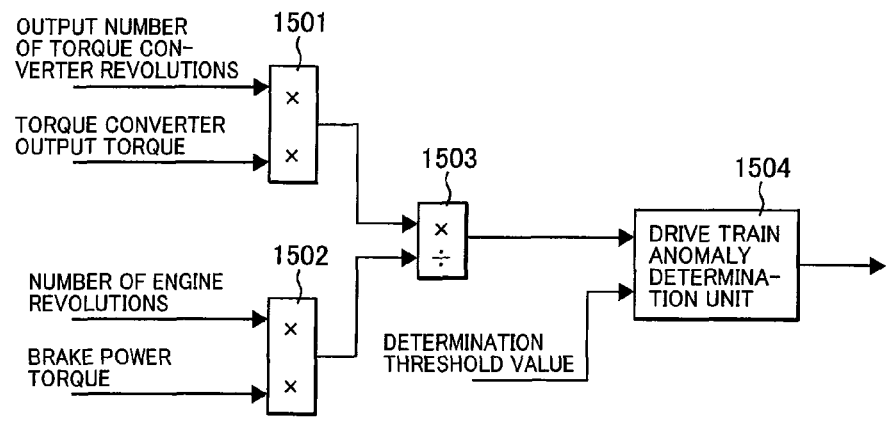
FIG. 12 is a block diagram of an example of an energy transfer diagnosis device of the invention for the drive train of a vehicle.

FIG. 12 illustrates an example of an energy transfer diagnosis device (anomaly detecting device) for a drive train based on the above-mentioned principle.

An output energy computation unit 1501 multiplies the output number of revolutions of the torque converter by the output torque of the torque converter to determine the output energy of the torque converter.

An input energy computation unit 1502 multiplies the input number of revolutions of the torque converter (number of engine revolutions) by the input torque of the torque converter (brake power torque) to determine the input energy of the torque converter.

An input-output energy ratio computation unit 1503 takes in the input energy of the torque converter obtained by the input energy computation unit 1502 and the output energy of the torque converter obtained by the output energy computation unit 1501. Then, it determines the ratio of the output energy of the torque converter to the input energy of the torque converter.

A drive train anomaly determination unit 1504 compares the ratio of the output energy to the input energy of the torque converter, obtained by the input-output energy ratio computation unit 1503, with a preset threshold value for determination. It thereby determines any anomaly in the drive train, especially, the torque converter.

The input and output numbers of revolutions of the torque converter can be measured at the torque converter section. The input/output torque of the torque converter may be obtained by using brake power torque or vehicle drive torque or may be directly measured with a torque sensor.

Figure 13:
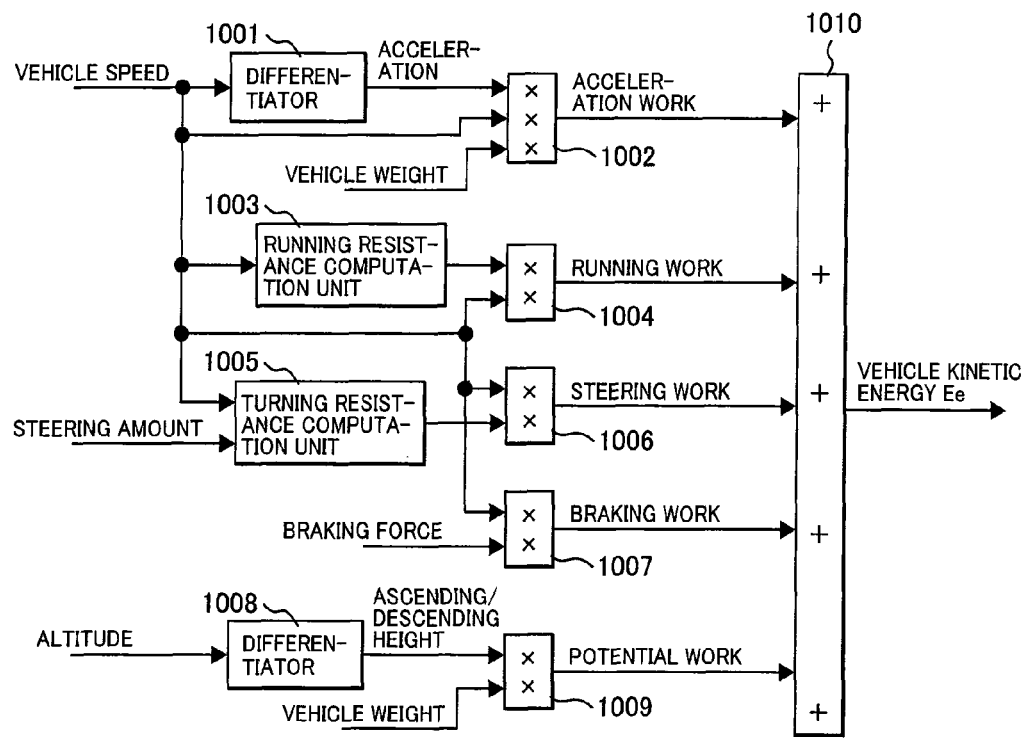
FIG. 13 is a block diagram illustrating a detailed example of a vehicle kinetic energy computation means in that embodiment.

FIG. 13 illustrates a detailed example of the vehicle kinetic energy computation means 504 for computing vehicle kinetic energy Ee. In this example, vehicle kinetic energy Ee is obtained from acceleration work, running work, steering work, braking work, and potential work.

The acceleration work is energy used to accelerate a vehicle. The acceleration work per unit time is determined in accordance with a principle of physics, by determining acceleration of the vehicle by differentiating the vehicle speed with a differentiator 1001, and multiplying the acceleration, the weight of the vehicle and vehicle speed as travel distance per unit time by each other with an acceleration work computation unit 1002.

Running resistance work is energy used to overcome the running resistance of a vehicle to maintain its vehicle speed. Work done per unit time for overcoming running resistance is similarly determined in accordance with a principle of physics, by determining a standard value of running resistance stored beforehand according to vehicle speed with a running resistance computation unit 1003, and multiplying the running resistance by the vehicle speed representing a travel distance per unit time with a running work computation unit 1004.

To enhance the accuracy of computation to determine the running resistance more accurately, the following measure may be taken: the air pressure of a tire is determined, the rolling resistance of the tire corresponding to the air pressure is determined, and running resistance is thereby corrected. In addition, the accuracy of computation may be enhanced by detecting rough road running through a diagnosis of misfire in the engine and correcting running resistance that is increased during running on a rough road. Further, the rough road running may be detected with an acceleration sensor provided in the vehicle to detect change in the acceleration of a vertical direction of the vehicle.

Steering work is energy used to overcome running resistance that is increased when a vehicle is steered to maintain its vehicle speed. Work done per unit time by overcoming steering resistance is obtained by determining turning resistance from a steering amount and vehicle speed with a turning resistance computation unit 1005, and multiplying the turning resistance by the vehicle speed with a steering work computation unit 1006.

As another method for determining the steering work, the following method may be adopted. The method is comprised of determining change in the velocity vector of the vehicle from vehicle position information from a vehicle navigation system, separating this vehicle velocity vector into the traveling direction of the vehicle and the turning direction of the vehicle, and determining the steering work based on the velocity vector in the turning direction.

Regarding a braking work as energy, the braking work per unit time is determined by multiplying braking force by the vehicle speed with a braking work computation unit 1007.

A potential work increases potential energy when the altitude of a vehicle is increased by hill climbing or the like. The potential work is determined in accordance with a principle of physics, by taking in the altitude of the vehicle as a input value, differentiating this input value with a differentiator 1008 to determine an amount of change in altitude per unit time, and multiplying the amount of change in altitude by the weight of the vehicle with a potential work computation unit 1009.

The method for determining an altitude can be selected from among the following: a method of measuring atmospheric pressure, a method of using map information from a navigation system, and a method of providing an acceleration sensor in the vehicle, determining the gradient of the road from change in the direction of gravity and determining change in altitude from the gradient and a travel distance, and the like. The method for determining the weight of the vehicle can be appropriately selected from among the following according to the system to which the invention is applied: a method using a nominal fixed value; a method of estimating it from a number of occupants; a method of estimating it from deflection of a vehicle spring; a method of estimating it from a fuel quantity; and the like.

The works determined as mentioned above are summed by a sum computation unit 1010 to compute vehicle kinetic energy Ee per unit time.

Figure 5:
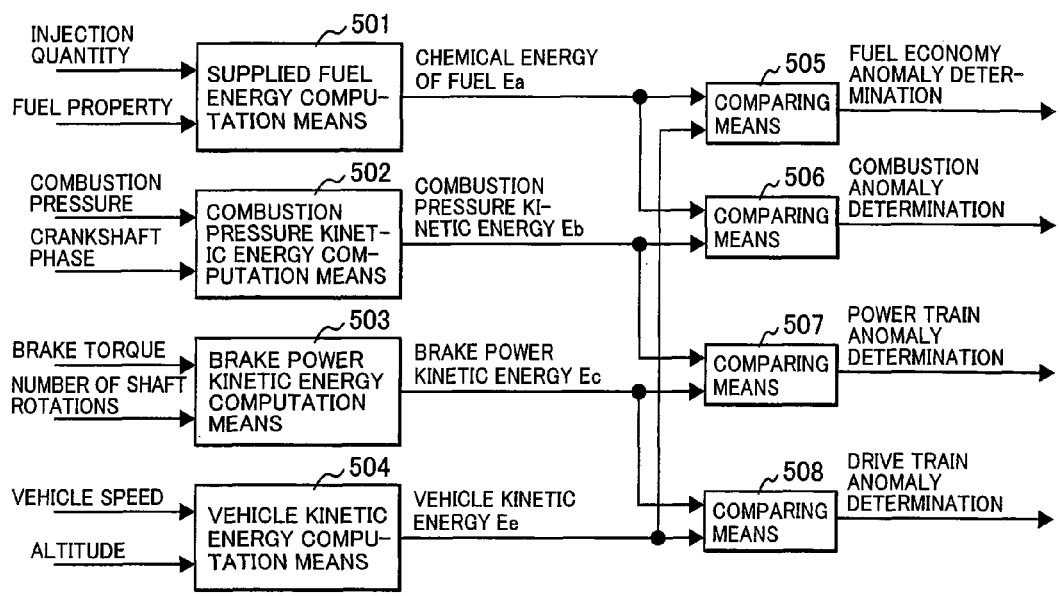
FIG. 5 is a block diagram illustrating an embodiment of a diagnosis device for energy transfer in a vehicle of the invention.

As described up to this point, any anomaly in fuel efficiency can be determined and an abnormal area can be located by determining the parameters indicated in FIG. 5 by, for example, the several computation means described above.

In the example illustrated in FIG. 5, the input energy of the energy transfer system is defined as chemical energy Ea of fuel and the output energy of the energy transfer system is defined as vehicle kinetic energy Ee. However, these values can be appropriately selected according to what in the energy transfer system is to be monitored. When only an engine system is to be monitored, for example, the chemical energy Ea of fuel is selected as input energy, and the brake power kinetic energy Ec is selected as output energy.

When it is unnecessary to locate the abnormal area, an intermediate energy amount of the energy transfer system need not be determined. In this case, comparison of the input energy and the output energy of the energy transfer system and anomaly determination may be merely carried out. The fundamental input energy of a vehicle using an internal combustion engine such as a gasoline engine as a prime mover is chemical energy Ea of fuel. Therefore, common fuel efficiency determination can be carried out by taking chemical energy Ea of fuel as the input energy of the energy transfer system.

Description will be given to the actual operating state of a vehicle and examples of the behavior of various energies with reference to FIG. 14.

Figure 14:
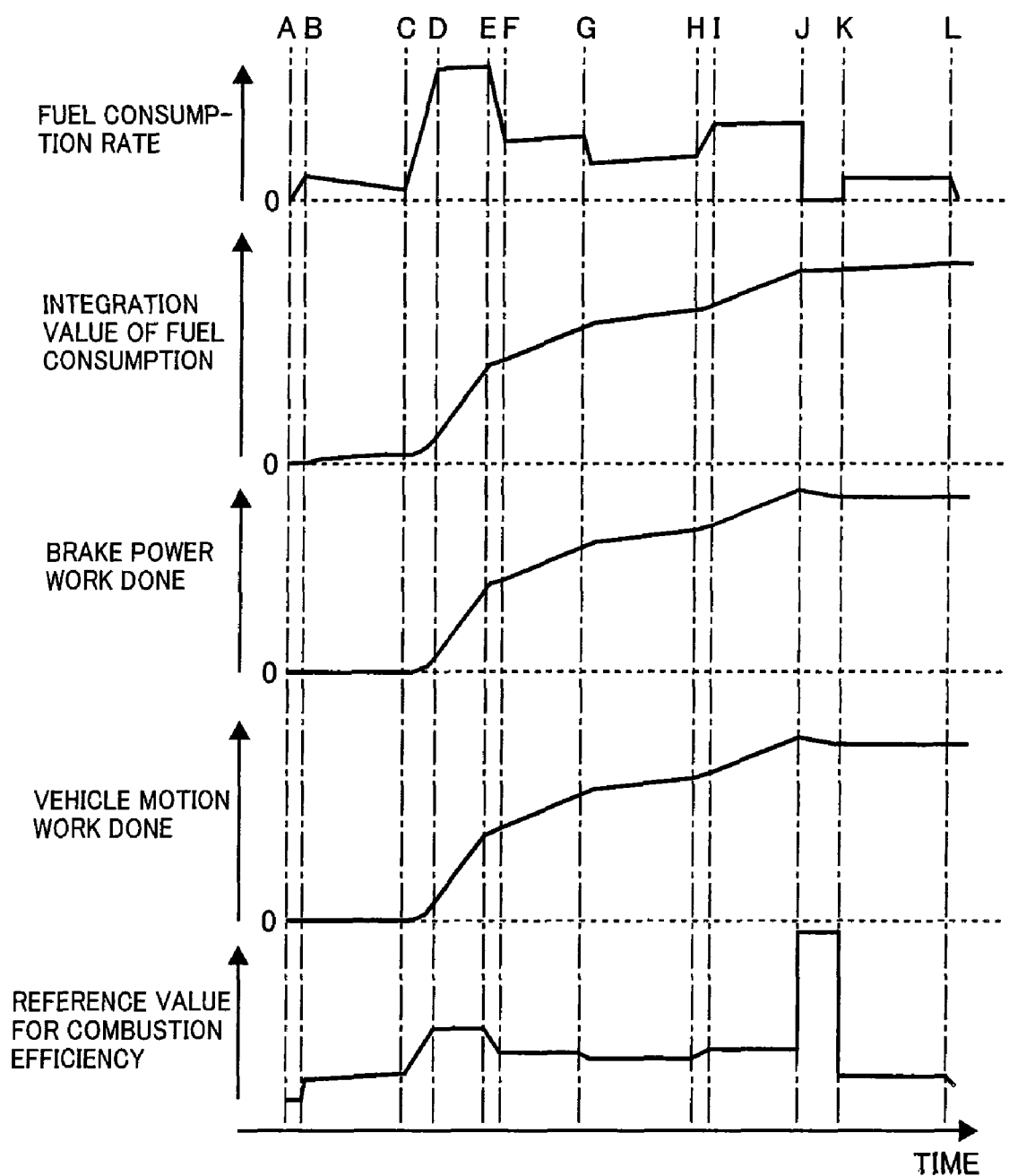
FIG. 14 is a time diagram illustrating the actual operating state of a vehicle and examples of the behavior of various energies.

In FIG. 14, the period from time A to time B represents engine starting; the period from time B to time C represents first left idled state; the period from time C to time D represents acceleration at the time of starting from standstill state; the period from time D to time E represents constant speed running state; the period from time E to time F represents decelerating state; the period from time F to time G represents constant speed running at a speed lower than in the period between D and E; the period from time G to time H represents running state at a speed further lower than in the period between F and G; the period from time H to time I represents accelerating state; the period from time I to time J represents running state at a speed between that in the period between D and E and that in the period between F and G; the period from time J to time K represents fuel cut state with full deceleration; the period from time K to time L represents left idled state; and at time L, the engine is stopped.

The uppermost part of FIG. 14 represents fuel consumption rate as fuel consumption per unit time. The fuel consumption rate basically depends on the combustion pressure work of an engine.

The immediately lower part represents the integration value of fuel consumption. The fuel consumption integration value indicates also the integral value of fuel consumption rate.

The further immediately lower part represents the brake power work done of the engine. The brake power work done is an integration value from the start of operation. When the engine is in idle state, since the brake power is zero, the brake power work done does not vary. In fuel cut state, since the engine accepts a work from the drive train, the brake power work done shows such behavior that it is gradually reduced.

The further immediately lower part represents a vehicle motion work done. The vehicle motion work done is an integration value from the start of operation. It behaves substantially similarly with the brake power work done. To be precise, it varies relative to a brake power work done according to the energy conversion efficiency of the drive train.

The lowermost part represents the reference value of nominal combustion efficiency observed when the engine is in normal state. The reference value of combustion efficiency is determined by, for example, the computation means illustrated in FIG. 8. The reference value of combustion efficiency takes various values depending on the operating state of the engine as mentioned above.

Therefore, a vehicle motion work done when the vehicle is in normal state can be obtained from the integration value of fuel consumption, fuel energy per unit fuel quantity, not shown, and the reference value of combustion efficiency. For this reason, any anomaly in energy transfer can be detected by comparing the obtained vehicle motion work done with a detected vehicle motion work done. Any abnormal area can be located by comparing the obtained vehicle motion work done with a detection value of an energy amount at some point on the way of the energy transfer path as well though this is not shown in the drawing.

The timing of determination can be appropriately selected based on the type of intended anomaly detection and the accuracy of determination. For example, when the target of detection of any anomaly in fuel efficiency is an overall anomaly in ordinary running, the above-mentioned comparison can be carried out by total energy integration value from the start to the stop of the vehicle, as illustrated in the drawing. When the purpose is to detect any anomaly in a short time after the occurrence of the anomaly, determination can be carried out at short time intervals.

When random noise is superposed on detection or determination value when some event is observed, in general, the detection accuracy can be enhanced by adding an integral element to the detection or determination value to eliminate the influence of the noise component. Therefore, it is advisable to carry out determination at intervals of a time necessary and sufficient to ensure required detection accuracy.

Description will be given to an example of a diagnosis device that determines any anomaly in an energy transfer path and locates an abnormal area from the above viewpoint with reference to FIG. 15.

A supplied fuel energy computation means 1201 is the same as the supplied fuel energy computation means 501 in FIG. 5. It determines the chemical energy Ea of supplied fuel per unit time by, for example, the computation means illustrated in FIG. 6.

A combustion pressure kinetic energy-conversion efficiency computation means 1202 determines the conversion efficiency based on the operating conditions as described with reference to FIG. 14. The conversion efficiency is that when converting the chemical energy Ea of supplied fuel, which varies depending on the operating conditions, into combustion pressure kinetic energy Eb.

A combustion pressure kinetic energy estimation value computation means 1208 is an output energy estimation value computation means. It multiplies the chemical energy Ea of supplied fuel, which is determined with the supplied fuel energy computation means 1201, by the energy conversion efficiency, which is determined by the combustion pressure kinetic energy-conversion efficiency computation means 1202. It thereby determines a combustion pressure kinetic energy estimation value per unit time under normal conditions. When this combustion pressure kinetic energy estimation value is integrated by an integrator 1211, the total amount of combustion pressure kinetic energy estimation value from the start of integration can be determined.

A combustion pressure kinetic energy computation means 1203 is an output energy computation means, and it is the same as the combustion pressure kinetic energy computation means 502 in FIG. 5. It determines combustion pressure kinetic energy Eb per unit time (determination value) by using, for example, the combustion pressure work done computation means illustrated in FIG. 7. When this combustion pressure kinetic energy Eb is integrated by an integrator 1212, the total amount of combustion pressure kinetic energy determination value from the start of integration can be determined.

The ratio of the total amount of combustion pressure kinetic energy estimation value outputted by the integrator 1211 to the total amount of combustion pressure kinetic energy determination value outputted by the integrator 1212, namely, the rate of change in combustion efficiency is determined with a combustion efficiency changer rate computation means 1217 as a comparing means. The obtained value is close to 1 under normal conditions and is smaller than 1 under abnormal conditions. Thus, any anomaly in combustion efficiency (any anomaly in combustion) can be determined.

A brake power kinetic energy conversion efficiency computation means 1204 determines the efficiency of conversion from the combustion pressure kinetic energy Eb to the brake power kinetic energy Ec based on the following, for example: an estimation value of loss energy from the loss energy estimation computation means illustrated in FIG. 10.

A brake power kinetic energy estimation value computation means 1209 is another output energy estimation value computation means. It determines a brake power kinetic energy estimation value per unit time under normal conditions by multiplying together the following: the combustion pressure kinetic energy Eb determined by the combustion pressure kinetic energy computation means 1203 and the energy conversion efficiency determined by the brake power kinetic energy conversion efficiency computation means 1204. When this brake power kinetic energy estimation value is integrated by an integrator 1213, the total amount of brake power kinetic energy estimation value from the start of integration can be determined.

A brake power kinetic energy computation means 1205 is an output energy computation means, and it is the same as the brake power kinetic energy computation means 503 in FIG. 5. It computes the brake power kinetic energy Ec per unit time (determination value) using, for example, the computation means illustrated in FIG. 9. When this brake power kinetic energy Ec is integrated by an integrator 1214, the total amount of brake power kinetic energy detection value from the start of integration can be determined.

An engine efficiency computation means 1218 as a comparing means determines the ratio of the total amount of brake power kinetic energy estimation value outputted by the integrator 1213 to the total amount of brake power kinetic energy determination value outputted by the integrator 1214, that is, the rate of change in engine efficiency. The obtained value is close to 1 under normal conditions and is smaller than 1 under abnormal conditions. Thus, any anomaly in engine efficiency (any anomaly in the power train) can be determined.

A vehicle kinetic energy conversion efficiency computation means 1206 determines the efficiency of conversion from the brake power kinetic energy Ec and from combustion pressure kinetic energy Eb to vehicle kinetic energy Ee.

A vehicle kinetic energy estimation value computation means 1210 is another output energy estimation value computation means. It computes a vehicle kinetic energy estimation value per unit time under normal conditions by multiplying together the following: the brake power kinetic energy Ec determined by the brake power kinetic energy computation means 1205 and the energy conversion efficiency determined by the vehicle kinetic energy conversion efficiency computation means 1206. When this vehicle kinetic energy estimation value is integrated by an integrator 1215, the total amount of vehicle kinetic energy estimation value from the start of integration can be determined.

A vehicle kinetic energy computation means 1207 is an output energy computation means, and it is the same as the vehicle kinetic energy computation means 504 in FIG. 5. It determines vehicle kinetic energy Ee per unit time (determination value) by using, for example, the computation means illustrated in FIG. 12. When this vehicle kinetic energy Ee is integrated by an integrator 1216, the total amount of vehicle kinetic energy determination value from the start of integration can be determined.

Therefore, a means 1219 for determining a rate of change in drive train efficiency (a drive train efficiency change rate computation means 1219) as a comparing means determines the ratio of the total amount of vehicle kinetic energy estimation value outputted by the integrator 1215 to the total amount of vehicle kinetic energy determination value outputted by the integrator 1216, that is, the rate of change in drive train efficiency. The obtained value is close to 1 under normal conditions and is smaller than 1 under abnormal conditions. Thus, any anomaly in drive train efficiency (any anomaly in the drive train) can be determined.

As described up to this point, a rate of change in combustion efficiency, a rate of change in engine efficacy, and a rate of change in drive train efficiency can be determined. The result of change rate computations from the combustion efficiency change rate computation means 1217, the engine efficiency change rate computation means 1218, and the drive train efficiency change rate computation means 1219, are inputted to an abnormal area locating means 1220 as a determination flag with an output source address or the like. Thus, anomaly determination can be carried out by identifying a faulty area where an anomaly has occurred as combustion in the engine 107, power train, drive train, or the like.

In determination of any anomaly in energy conversion efficiency, a vehicle kinetic energy estimation value per unit time of the entire energy system under normal conditions is determined by multiplying the following together with another vehicle kinetic energy estimation value computation means 1221: the energy conversion efficiency determined by each of the combustion pressure kinetic energy conversion efficiency computation means 1202, brake power kinetic energy conversion efficiency computation means 1204 and vehicle kinetic energy conversion efficiency computation means 1206; and the chemical energy Ea of supplied fuel determined by the supplied fuel energy computation means 1201. When this vehicle kinetic energy estimation value is integrated by an integrator 1222, the total amount of vehicle kinetic energy estimation value from the start of integration can be determined.

The vehicle kinetic energy estimation value determined by the vehicle kinetic energy estimation value computation means 1221 is different from the vehicle kinetic energy estimation value determined by the vehicle kinetic energy estimation value computation means 1210. That is, the vehicle kinetic energy estimation value determined by the vehicle kinetic energy estimation value computation means 1210 is an estimation value obtained when only the drive train is normal. Meanwhile, the vehicle kinetic energy estimation value determined by the vehicle kinetic energy estimation value computation means 1221 is an estimation value obtained when the entire energy transfer system is normal.

An energy conversion efficiency computation means 1223 determines the ratio of the total amount of vehicle kinetic energy estimation value outputted by the integrator 1222 to the total amount of vehicle kinetic energy determination value outputted by the integrator 1216, that is, the rate of change in energy conversion efficiency.

The obtained value is close to 1 under normal conditions and is smaller than 1 under abnormal conditions.

Therefore, when the rate of change in energy conversion efficiency determined by the rate of change in energy conversion efficiency computation means 1223 takes a value significantly smaller than 1, the energy conversion efficiency can be determined to be abnormal.

Also in this embodiment, it is possible to take appropriate action, including sending out a warning and prompting repair or maintenance work, based on the anomaly determination by each part mentioned above.

The above description has been given to embodiments adopted when the accuracy of estimation or determination including detection of each energy amount is sufficient. The sufficient accuracy of estimation or determination of each energy amount may not be obtained depending on the state of the energy transfer system to be monitored or the state of a sensor or the like for determining each energy.

Concrete examples of such cases include: cases where a sensor used for computation for the determination or estimation of energy is faulty, cases where the precision of a sensed physical quantity is insufficient because of the characteristics of a sensor, cases where the sufficient precision of computation of an energy determination value or estimation value cannot be obtained; and the like.

Figure 16:
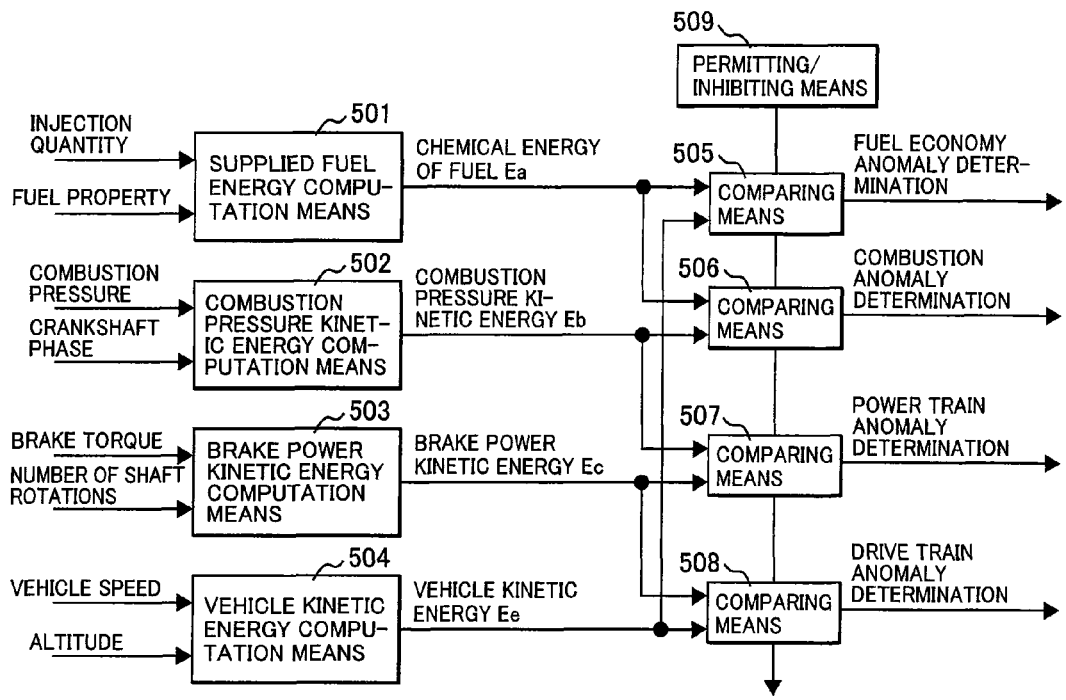
FIG. 16 is a block diagram illustrating another embodiment of a diagnosis device for energy transfer in a vehicle of the invention.

In such a case, a comparison operation permitting/inhibiting means 509 for inhibiting determination of any anomaly in energy conversion efficiency and location of any area where an anomaly has occurred in energy conversion can be provided as illustrated in FIG. 16.

In FIG. 16, the members corresponding to those in FIG. 5 will be marked with the same reference numerals as used in FIG. 5, and the description of them will be omitted.

The comparison operation permitting/inhibiting means 509 may simultaneously permit or inhibit all the comparison operations by the comparing means 505 to 508. Or, it may permit or inhibit only the comparison operation by a specific comparing means. Which to use can be appropriately selected based on the extent of influence of an event to be permitted or inhibited.

By carrying out this permission or inhibition, it is possible to prevent erroneous determination of an anomaly in energy transfer efficiency and erroneous location of an abnormal area.

Such examples will be taken as follows. The vehicle kinetic energy computation means illustrated in FIG. 13 uses vehicle speed as its input. When a vehicle speed is computed from a number of wheel rotations, a precise vehicle speed cannot be sensed if the wheel slips. To cope with this, for example, a slip of a wheel is detected by comparing the rotational speed of the wheel with the acceleration of the vehicle in various directions; and if the wheel slips, inhibiting processing is carried out by the comparison operation permitting/inhibiting means 509. Such inhibiting processing includes avoiding vehicle kinetic energy computation and avoiding comparison of computed vehicle kinetic energy with other energy. Thus, it is possible to prevent erroneous determination of an anomaly in energy transfer efficiency and erroneous location of an abnormal area.

Also, when the braking force of a brake is large, it is required to accurately get the braking force. If high accuracy cannot be expected because of the configuration of the system, it is possible to prevent erroneous determination of an anomaly in energy transfer efficiency and erroneous location of an abnormal area by taking the following measure: under rare operation conditions, for example, when engine output is high and yet the braking force of a brake is large, determination is inhibited by the comparison operation permitting/inhibiting means 509.

Further, when the properties of fuel are determined to get the supplied fuel energy, it is possible to prevent erroneous determination of an anomaly in energy transfer efficiency and erroneous location of an abnormal area by taking the following measure: when the properties of fuel are not got, for example, immediately after refueling, determination is inhibited by the comparison operation permitting/inhibiting means 509.

If the accuracy of determination or estimation of each energy amount cannot be sufficiently obtained for some reason, determination is inhibited by the comparison operation permitting/inhibiting means 509. Thus, it is possible to prevent erroneous determination of an anomaly in energy transfer efficiency and erroneous location of an abnormal area. The above-mentioned reason includes the state of an energy transfer system to be generally monitored and the state of a sensor or the like for sensing each energy, mentioned above.

Energy transfer efficiency is degraded depending on the operating state of a vehicle or operating conditions. However, a state that cannot be designated as an anomaly or a fault also does exist. Examples of such a state include cases where oil in an engine or a drive train is deteriorated and friction loss is increased, cases where the air pressure in a tire is reduced and running resistance is increased, and the like. These are cases of poor maintenance of a vehicle and cannot be designated as cases of a fault. As described above, the energy transfer efficiency is degraded even in these cases, and determination of a fault may be made depending on the degree of oil deterioration or the air pressure of a tire.

In these cases, it is advisable to take the following measure: the degree of oil deterioration and the air pressure in each tire are got by sensors; when the energy transfer efficiency is determined to be abnormal and the degree of oil deterioration is high or the air pressure in a tire is abnormal, the determination of a fault is not made; and instead, a warning is sent out informing that the degree of oil deterioration is high or the air pressure in a tire is abnormal.

That is, when any anomaly in energy transfer is determined, faults in the energy transfer system and those other than faults in the energy transfer system, such as poor maintenance of the vehicle, are discriminated from each other.

Thus, the driver of the vehicle can learn that fuel efficiency has been degraded and that the degree of oil deterioration is high or the air pressure in a tire is abnormal, and carry out required maintenance work on the vehicle. This makes it possible to prevent unnecessary processing from being carried out based on erroneous recognition of a fault.

Figure 15:
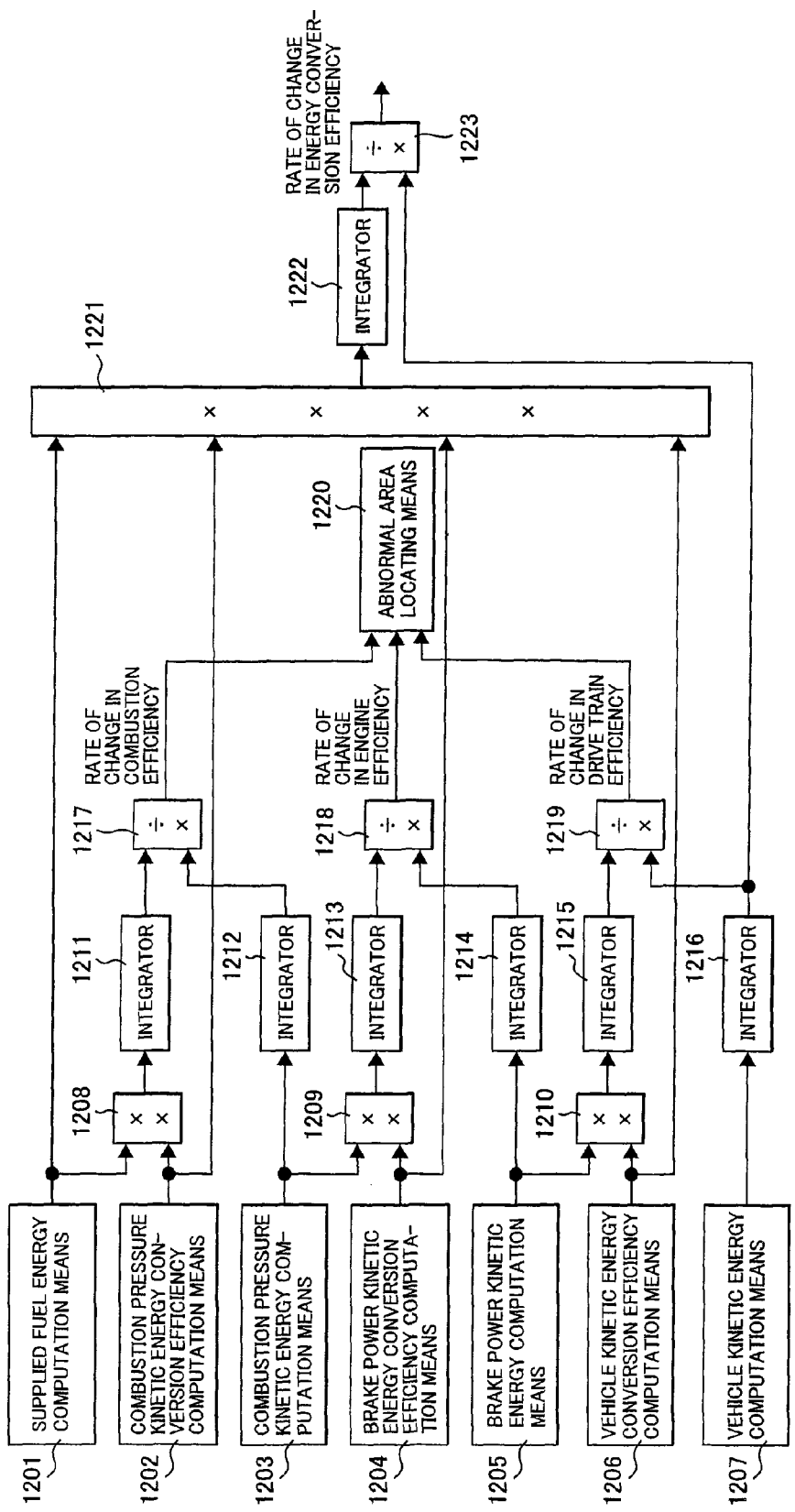
FIG. 15 is a block diagram illustrating another embodiment of a diagnosis device for energy transfer in a vehicle of the invention.

The above-mentioned comparison operation permitting/inhibiting means 509 can be similarly applied to the abnormal area locating means 1220 and the energy conversion efficiency change rate computation means 1223 in the example illustrated in FIG. 15.

The diagnosis device described up to this point is so constructed as to carry out determination using varied information pertaining to the entire vehicle. Various systems in a vehicle are usually controlled by plural control systems. That is, usually, the control on an energy transfer path is shared among some control devices and each part of the energy transfer path is controlled by an individual control device. In other words, there are provided multiple control devices that control the individual parts of the energy transfer system in a shared manner.

Figure 17:
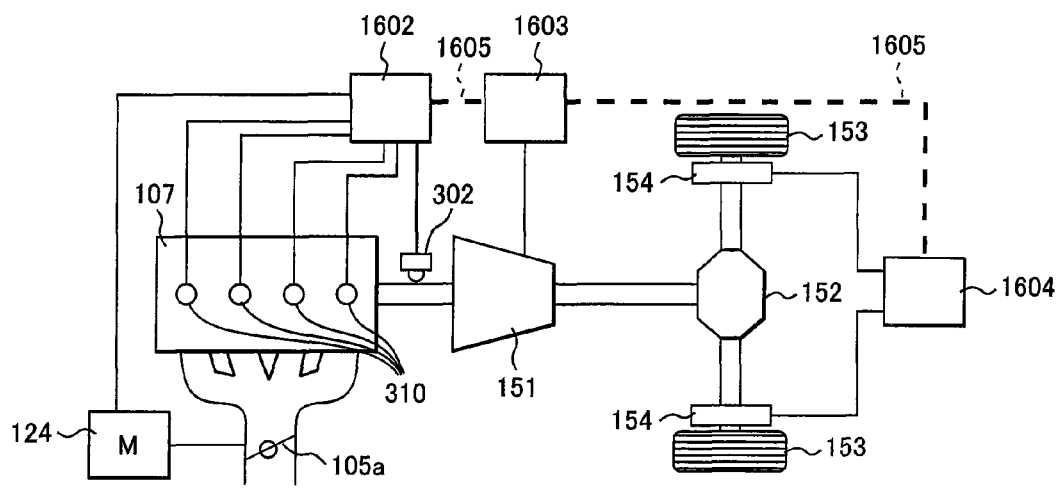
FIG. 17 is a schematic diagram illustrating an example of the control system of a vehicle to which an energy transfer diagnosis device of the invention is applied.

In the example illustrated in FIG. 17, the engine 107 is controlled by an engine system control device 1602; the transmission 151 is controlled by a transmission system control device 1603; and the braking device 154 is controlled by a brake system control device 1604.

These control devices 1602 to 1604 are positioned at the respective parts of the energy transfer path. They control the respective systems by taking in signals required for the respective systems, carrying out computation, and outputting signals to an actuator.

A vehicle mounted with a meter panel control device, a steering control device, a navigation system control device, a vehicle power supply system control device, or the like is possible though they are not shown in the drawing.

To carry out the above-mentioned determination with this construction, it is advisable to take the following measure because required information is recognized in the individual control devices: determination is carried out by communicating required information between respective control devices through CAN (Controller Area Network) 1605 indicated by broken line in the drawing. The CAN 1605 functions as a means for sending and receiving information pertaining to the determination of any anomaly in energy transfer between the individual control devices.

An example will be taken as follows. A lot of information required for computing supplied fuel energy and combustion pressure kinetic energy is in the possession of the engine system control device 1602. A lot of information required for computing brake power kinetic energy is in the possession of the transmission system control device 1603. Therefore, a determination value of brake power energy is got and outputted from the transmission system control device 1603, and the result of the determination is inputted to the engine system control device 1602 to carry out other determination. This makes it unnecessary to redundantly input a signal, inputted to the transmission system control device 1603, to the engine system control device 1602, and the above determination can be carried out by a simpler system configuration.

Information communicated between the respective control devices can be appropriately selected according to the configuration. A control device for determining any anomaly in energy transfer can also be appropriately selected according to the configuration.

The prime mover of a vehicle to which an energy transfer diagnosis device of the invention is applicable need not be a gasoline engine. The prime mover may be one of various internal combustion engines such as diesel engines, an electric motor, or a hybrid type as a combination of them.

In vehicles using an internal combustion engine, chemical energy of supplied fuel is used to determine any anomaly in the power train. In a vehicle using an electric motor as its prime mover, any anomaly in the power train can be determined through comparison of electrical energy supplied to the electric motor with the brake power energy of the electric motor, instead.

The invention related to failure determination devices having a means for diagnosing the energy transfer efficiency of a vehicle can be applied to cases where any anomaly in energy transfer efficiency is detected.

What is claimed is:

1. A diagnosis device for an energy transfer system in a vehicle using fuel, comprising:
    an input energy computation means for determining an input energy of the energy transfer system of the vehicle, the energy transfer system being configured to convert the input energy into an output energy of the energy transfer system through at least two intermediate process energies that are energy transfer mediums at an intermediate process of the energy transfer system;
    an intermediate process energy computation means for determining the intermediate process energies of the energy transfer system;
    an output energy computation means for determining the output energy of the energy transfer system;
    a fuel efficiency anomaly determination use comparing means for comparing the input energy with the output energy to determine whether or not an anomaly occurs in fuel efficiency of the vehicle;
    an energy transfer anomaly determination use comparing means for comparing the input energy with a first intermediate process energy of the intermediate process energies, comparing the intermediate process energies with each other, and comparing a last intermediate process energy of the intermediate process energies with the output energy, to determine whether or not any anomaly occurs in the energy transfer system;
    wherein the input energy is chemical energy of the fuel supplied to an internal combustion engine;
    wherein the output energy is vehicle kinetic energy; and
    wherein the intermediate process energies are of at least combustion pressure kinetic energy as the first intermediate process energy and brake power kinetic energy as the last intermediate process energy.

2. The diagnosis device for energy transfer in a vehicle according to claim 1,
    wherein the energy transfer anomaly determination use comparing means determines an anomaly in the internal combustion engine based on a result of comparing the chemical energy of the fuel with the combustion pressure kinetic energy.

3. The diagnosis device for energy transfer in a vehicle according to claim 1,
    wherein the energy transfer anomaly determination use comparing means determines an anomaly in a power train based on a result of comparing the combustion pressure kinetic energy with the brake power kinetic energy.

4. The diagnosis device for energy transfer in a vehicle according to claim 1,
    wherein the energy transfer anomaly determination use comparing means determines an anomaly in a drive train based on a result of comparing the brake power kinetic energy with the vehicle kinetic energy.

5. The diagnosis device for energy transfer in a vehicle according to claim 1,
    wherein the intermediate process energy computation means determines an input energy of a torque converter using for automatic transmission of the energy transfer system and determines an output energy of the torque converters; and
    wherein the energy transfer anomaly use comparing means determines an anomaly in a drive train based on a result of comparing the input energy of the torque converter with the output energy of the torque converter.

6. The diagnosis device for energy transfer in a vehicle according to claim 1,
    wherein the fuel efficiency anomaly determination use comparing means determines whether or not the vehicle has done work in line with fuel consumed by comparing the chemical energy with the kinetic energy, and whether or not the anomaly occurs in the fuel efficiency based on the work.

7. The diagnosis device for energy transfer in a vehicle according to claim 1, comprising an anomaly determination inhibiting means for inhibiting anomaly determination according to a state of the vehicle.

8. The diagnosis device for energy transfer in a vehicle according to claim 1, comprising:
    plural control devices for controlling various parts of the energy transfer system in a shared manner; and
    an information sending/receiving means for sending and receiving information pertaining to the determination of any anomaly in the energy transfer system between the control devices.

* * * * *